United States Patent
Cappiello, Sr.

(10) Patent No.: US 6,782,635 B1
(45) Date of Patent: Aug. 31, 2004

(54) MEASUREMENT GAUGE HAVING EXTENSIONS

(76) Inventor: Frank J. Cappiello, Sr., 5 Richter Dr., Danbury, CT (US) 06810

( * ) Notice: Subject to any disclaimer, the term of this patent is extended or adjusted under 35 U.S.C. 154(b) by 0 days.

(21) Appl. No.: 08/308,257

(22) Filed: Sep. 19, 1994

(51) Int. Cl.$^7$ .............................. G01B 5/14; G01B 3/38
(52) U.S. Cl. ............................... 33/828; 33/831; 33/783
(58) Field of Search .......................... 33/828, 829, 831, 33/794, 783, 784, 787, 791, 792, 793, 795, 796, 813, 818, 819, 820

(56) References Cited

U.S. PATENT DOCUMENTS

| | | | | |
|---|---|---|---|---|
| 1,333,453 A | * | 3/1920 | Saedo et al. | 33/828 |
| 1,616,060 A | * | 2/1927 | Myers | 33/679.1 |
| 2,443,126 A | * | 6/1948 | Whitaker | 33/813 |
| 3,166,850 A | * | 1/1965 | Yamazawa | 33/828 |
| 3,365,803 A | * | 1/1968 | Binns et al. | 33/679.1 |
| 4,553,337 A | * | 11/1985 | Brewster | 33/784 |
| 4,570,349 A | * | 2/1986 | Finkelman et al. | 33/784 |
| 4,608,759 A | * | 9/1986 | Bowhay | 33/796 |
| 4,845,646 A | * | 7/1989 | Marquis et al. | 33/784 |

FOREIGN PATENT DOCUMENTS

FR  2587104  * 3/1987 .................. 33/784

* cited by examiner

Primary Examiner—Christopher W. Fulton

(57) ABSTRACT

A pair of extensions for a gauge for measuring objects is disclosed. Various construction details are developed that provide extensions that may be used to determine the size of objects, such as gemstones, that are embedded within a structure and not accessible by conventional gauges. In a particular embodiment, a pair of extensions each having a sleeve and a member extending outward from the sleeve. The sleeve fits over a finger of the arms of a gauge and includes a set screw to attach the sleeve to the finger. The members include contact surfaces to be placed in contact the object to be measured. In another particular embodiment, at least one of the extensions has a tapered cross-section such that the distal end of the cross-section is sized to be inserted within the structure surrounding the object to be measured.

14 Claims, 2 Drawing Sheets

US 6,782,635 B1

MEASUREMENT GAUGE HAVING EXTENSIONS

TECHNICAL FIELD

The present invention relates to gauges, and more particularly to gauges for measuring gemstones in settings.

BACKGROUND OF THE INVENTION

In the jewelry business, being able to accurately measure size and determine the value of gemstones is extremely important. Inaccurate measurements increase the cost of doing business. For loose gemstones, the task is generally easier. Simple gauges such as micrometers or calipers may be fitted around the gemstone and very accurate measurements of size taken.

A typical gauge used in the jewelry business includes a pair of arms capable of convergent and divergent motion and means to determine the separation or displacement between the arms. Each of the arms includes a projection or finger that extends towards the opposite arm and mates with the opposite projection. The gemstone is placed between the contact surfaces of the mating surfaces of the projections and the separation between the contact surfaces is determined.

Measuring the size of gemstones in a setting such as a ring, however, pose a significant problem. The adjacent prongs of the ring, which are holding the gemstone in place, interfere with the ability to fit the arms of the standard gauges around the gemstones. In some instances this problem is alleviated by the setting having an opening in its bottom to permit the insertion of one of the projections. In many other instances the intricate nature of the setting does not allow for such an opening and the use of a standard gauge is impractical without removing the gemstone from the setting. Short of removing the gemstone from the setting, an estimate must be made of the size of the gemstone.

The prior art includes several devices for the measurement of gemstones. Disclosed in U.S. Pat. No. 4,524,525, titled "Diamond Gauge with Three-dimensional Stone Simulant" and issued to Finkler, is a gauge having a stone simulant for sizing settings for small diamonds. This device determines the size of gemstone that will fit within a small setting. U.S. Pat. No. 4,107,850, titled "Stone and Mounting Gauge" and issued to Adler, discloses a mounting gauge having a plurality of arms extending from a support assembly. Each of the arms has a disk like foot with each of the feet being successively larger. The feet may be inserted into a setting to make a comparison type measurement between the known size of the foot and the unknown size of the setting or gemstone.

The above art notwithstanding, people skilled in the art are working to develop devices for accurately measuring gemstones in their settings without requiring the removal of the gemstone from the setting or having to estimate the size of the gemstone.

DISCLOSURE OF THE INVENTION

According to the present invention, each of a pair of extensions for a gauge includes a sleeve and a member having a contact surface extending from the sleeve. The sleeve is sized to fit over the finger of the gauge and includes means to fixedly attach the sleeve to the finger. The contact surface extends outward along the member and the object to be measured by the gauge may be placed between the distal ends of the members. Extending the contact surfaces outward from the fingers permits measurement of objects by moving the contact surfaces and object laterally towards each other to bring them into proximity, and then converging the arms of the gauge until the contact surfaces engage the object and the measurement may be taken.

In one particular embodiment, at least one of the members is tapered in height and width. The tapering minimizes the size of the member at the distal end such that the tapered member will fit through the setting of a gemstone and may be engaged with the culet of the gemstone. The opposite member is engaged with the table of the gemstone and the size of the gemstone is thereby measured accurately without having to remove the gemstone from the setting. In another particular embodiment, both of the members are tapered in height and width. This particular configuration provides the benefit of being able to insert either or both of the members into the setting to measure the gemstone.

Although the invention was developed in the field of jewelry for measuring gemstones, it should be noted that the invention has application to other fields wherein the size of objects embedded within a structure is desired.

The foregoing and other objects, features and advantages of the present invention become more apparent in light of the following detailed description of the exemplary embodiments thereof, as illustrated in the accompanying drawings.

BEST MODE FOR CARRYING OUT THE INVENTION

Figure 1:
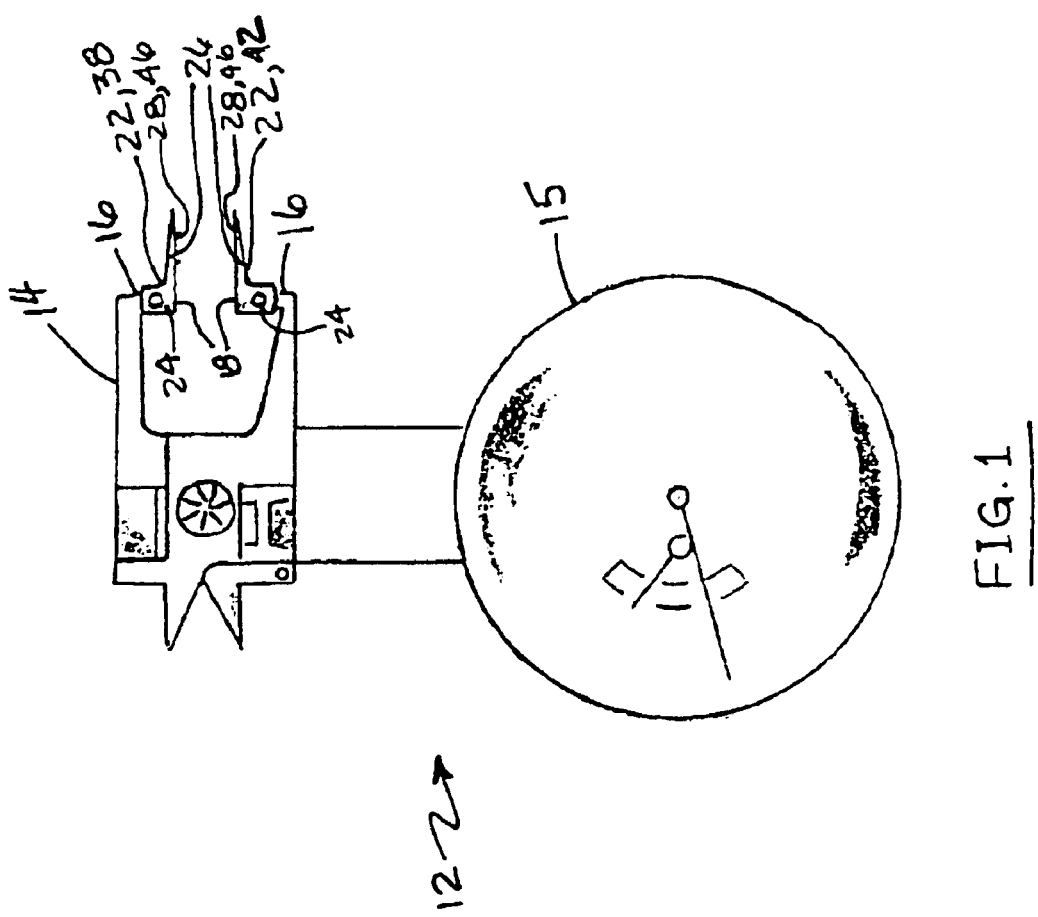
FIG. 1 is a front view of a gauge having a pair of extensions attached thereto.

Referring to FIG. 1, a standard jeweler's gauge 12 is illustrated. The gauge 12 includes a pair of arms 14 and means 15 to determine the separation or displacement between the arms 14. The pair of arms 14 extend in a longitudinal direction and are permitted converging and diverging motion relative to each other. Each arm 14 has a finger 16 extending perpendicular to the longitudinal direction of the arm 14. The fingers 16 are generally cylindrical in shape and include a pair of mating surfaces 18 that, upon sufficient converging motion of the arms 14, may mate with each other.

Figure 2:
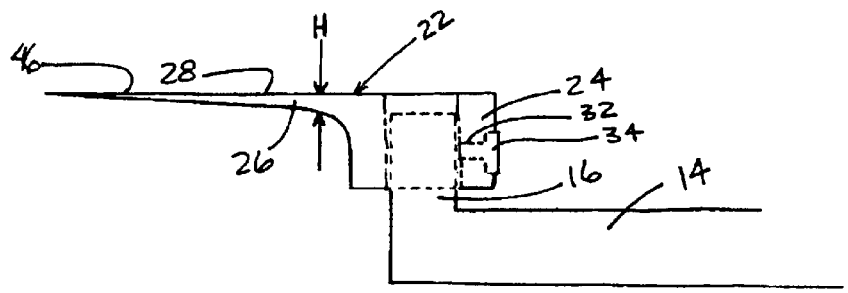
FIG. 2 is a partially cut-away side view of a single extension attached to one of the gauge projections.

Attached to each of the fingers 16 is one of a pair of extensions 22. Each extension 22 includes a sleeve 24, a member 26 extending outward from the sleeve 24, and an flat portion 28. Referring now to FIG. 2, the sleeve 24 is hollow and sized to fit around the finger 16 in a sliding fashion. The sleeve 24 includes a threaded aperture 32 and a corresponding threaded set screw 34 engaged with the aperture 32 to define means to fixedly attach the sleeve 24 to the finger 16. Upon sufficient engagement of the set screw 34 with the aperture 32, the set screw 34 meets the finger 16 to bind the sleeve 24 to the finger 16 and affix the sleeve 24, and thereby the extension 22, to the finger 16. [The flat portion 28 extends over one side of the finger 16. Engagement between the flat portion 28 and the finger 16 prevents the sleeve 24 from rotating about the finger 16 during use.]

As shown in FIG. 1, the pair of extensions 22 includes a first extension 38 and a second extension 42. Each of the extensions 38,42 includes a contact surface 46 and has a triangular cross-section that tapers in the direction outward from the sleeve 24. The contact surface 46 is flush with the contact surface 18 of the fingers 16.

Figure 3:
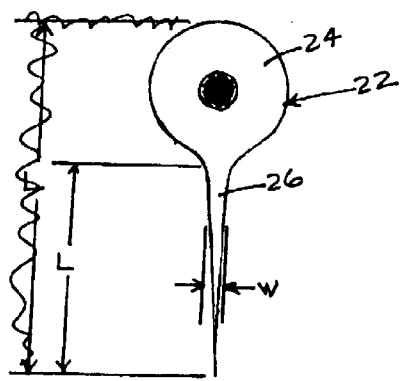
FIG. 3 is a top view of the single extension with the arm cut away.
Figure 4:
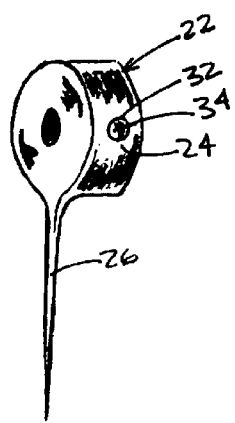
FIG. 4 is a perspective view of the single extension.

As shown in more detail in FIGS. 2, 3 and 4, the extensions 38,42 have length L, height H and width W dimensions. The length dimension L is much greater than the height H and width W dimensions. The contact surfaces 46 run the extent of the length L of the members 26. The height H and the width W taper from a maximum adjacent the sleeve 24 to a minimum at the distal end of the members 26.

Figure 5:
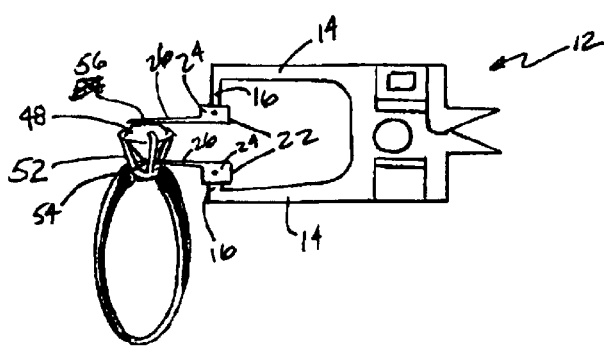
FIG. 5 is a side view of the extensions engaged with a gemstone in a ring setting.

During operation, the extensions 22 are used to determine the size of a gemstone 48 in a setting 52, as illustrated in FIG. 5. The member 26 of one of the extension 38,42 is inserted into the setting 52 and underneath the gemstone 48 such that the contact surface 46 is placed against the culet 54 of the gemstone 48. The opposite arm 14 of the gauge 12 is then moved in a convergent motion until the member 26 of the first extension 38 is adjacent the table 56 of the gemstone 48 and the contact surface 44 rests on the table 56 of the gemstone 48. The size of the gemstone 48 is then read from the gauge 12 in a conventional manner.

The means to fixedly attach the sleeves 24 to the fingers 16 provides means to removably attach the sleeves 24 to the extensions 22. As a result, the standard gauge 12 may be used in applications that do not require the extensions 22, such as the measurement of loose gemstones. If needed, the extensions 22 may be easily attached to the fingers 16, the measurements of set gemstones performed, and then the extensions 22 may be removed to place the gauge 12 back into its standard configuration. The extensions, however, may also be used to measure loose gemstones and other objects and, if desired, may be permanently attached or formed integrally with the fingers.

The tapered cross-section of the extensions 38,42 permit the distal ends of the extensions 38,42 to be small enough to fit within settings that are impractical for the conventional fingers 16 used with standard gauges 12. Although the extensions illustrated in FIG. 1 illustrates both extensions having a tapered cross-sections, the extensions may be formed with only one having the tapered cross-section. In this way, the extension having the tapered cross-section may be used to insert within the setting and the other, non-tapered extension may be brought into contact with the exposed table of the gemstone.

In addition, the tapered configuration is used to illustrate one embodiment that provides an extension that may be inserted within a setting such that the contact surface of the extension may be placed under the culet. It should be apparent to those skilled in the art that other embodiments may be used to produce a contact surface that is spaced outward from the fingers 16 and that is capable of being inserted within a setting.

It should be noted that the contact surfaces 46 as disclosed in FIGS. 1 to 5 extend along the length of the members 26. Although this may be for practical purposes of the simplest configuration, the contact surface may only be required at the distal end of the member, i.e. the portion of the member that is inserted under the culet or over the table of the gemstone.

Although the invention has been shown and described with respect with exemplary embodiments thereof, it should be understood by those skilled in the art that various changes, omissions, and additions may be made thereto, without departing from the spirit and scope of the invention.

What is claimed is:

1. A pair of removable extensions for use with a gauge for measuring size, the gauge including a pair of arms extending in a first direction, each arm having a finger projecting towards the opposite arm, the arms capable of converging and diverging motion relative to each other to produce displacements between the arms, such displacements being measurable by the gauge, each of the pair of extensions including a sleeve sized to fit over one of the fingers and a member extending outward from the sleeve, the sleeve including means to fixedly attach the sleeve to the finger over which it has been fit, the member including a contact surface facing towards the opposite arm in an installed condition such that the pair of contact surfaces face each other and, upon sufficient converging motion of the arms, the pair of contact surfaces engage each other, the member having a length dimension measured outward from the sleeve, a width dimension measured laterally to the length, and a height dimension measured laterally to the length and width, wherein the length dimension is greater than the width and height dimensions, wherein at least one member has a cross-sectional shape that gradually tapers in the direction outward from the sleeve to a minimum at the distal end, and wherein the contact surface extends in the length dimension such that the object to be measured may be located between the distal ends of the members.

2. The extensions according to claim 1, wherein the tapered member tapers along the length dimension such that the width of the member tapers from a maximum adjacent the sleeve to a minimum at the distal end of the member.

3. The pair of extensions according to claim 2, wherein the tapered member also tapers along the length dimension such that the height of the member at the distal end is less than the height of the member inward of the distal end.

4. The pair of extensions according to claim 1, wherein the tapered member tapers along the length dimension such that the height of the member tapers from a maximum adjacent the sleeve to a minimum at the distal end of the member.

5. The pair of extensions according to claim 1, wherein the means to fixedly attach the sleeve to the finger includes means to removably attach the sleeve, wherein the means to removably attach is defined by a threaded aperture in the sleeve and a correspondingly threaded screw, wherein upon sufficient engagement between the screw and the threaded aperture the screw binds the sleeve to the finger.

6. The pair of extensions according to claim 1, wherein the tapered extension tapers to a cross-sectional sufficiently small to fit within jewelry settings to measure gemstones.

7. A gauge for measuring the size of an object, the gauge including a pair of arms extending in a first direction, each arm having a finger projecting towards the opposite arm, the arms capable of converging and diverging motion relative to each other to produce displacements between the arms, such displacements being measurable by the gauge, each of the fingers including a member extending outward from the finger, the member including a contact surface facing towards the opposite arm in an installed condition such that the pair of contact surfaces face each other and, upon sufficient converging motion of the arms, the pair of contact surfaces engage each other, the member having a length dimension measured outward from the finger, a width dimension measured laterally to the length, and a height dimension measured laterally to the length and width, wherein the length dimension is greater than the width and height dimensions, wherein at least one of the members has a cross-sectional shape that gradually tapers in the direction outward from the sleeve to a minimum at the distal end, and wherein the contact surface extends in the length dimension such that the object to be measured may be located between the distal ends of the members.

8. The gauge according to claim 7, wherein each of the members includes a sleeve sized to slide over the fingers such that the members are removable from the gauge, each sleeve including means to fixedly attach the sleeve to the finger in an installed condition.

9. The gauge according to claim 8, wherein the means to fixedly attach the sleeve to the finger is defined by a threaded aperture in the sleeve and a correspondingly threaded screw, wherein upon sufficient engagement between the screw and the threaded aperture the screw binds the sleeve to the finger.

10. The gauge according to claim 8, wherein the tapered extension tapers to a cross-sectional sufficiently small to fit within jewelry settings to measure gemstones.

11. The gauge according to claim 7, wherein the tapered member tapers along the length dimension such that the width of the member tapers from a maximum adjacent the sleeve to a minimum at the distal end of the member.

12. The gauge according to claim 11, wherein the tapered member also tapers along the length dimension such that the height of the member at the distal end is less than the height of the member inward of the distal end.

13. The gauge according to claim 7, wherein the tapered member tapers along the length dimension such that the height of the member tapers from a maximum adjacent the sleeve to a minimum at the distal end of the member.

14. A pair of removable extensions for use with a gauge for measuring size, the gauge including a pair of arms extending in a first direction, each arm having a finger projecting towards the opposite arm, the arms capable of converging and diverging motion relative to each other to produce displacements between the arms, such displacements being measurable by the gauge, each of the pair of extensions including a sleeve sized to fit over one of the fingers and a member extending outward from the sleeve, the sleeve including a threaded aperture and a correspondingly threaded screw, wherein upon sufficient engagement between the screw and the threaded aperture the screw binds the sleeve to the finger, the member including a contact surface facing towards the opposite arm in an installed condition such that the pair of contact surfaces face each other and, upon sufficient converging motion of the arms, the pair of contact surfaces engage each other, the member having a length dimension measured outward from the sleeve, a width dimension measured laterally to the length, and a height dimension measured laterally to the length and width, wherein the length dimension is greater than the width and height dimensions, wherein at least one of the members tapers in height and width along the length dimension such that the member has a cross-sectional shape that gradually tapers in the direction outward from the sleeve to a minimum at the distal end, and wherein the contact surface extends in the length dimension such that the object to be measured may be located outward between the distal ends of the members.

* * * * *